United States Patent
Hirata

(10) Patent No.: US 9,944,263 B2
(45) Date of Patent: Apr. 17, 2018

(54) MASTER CYLINDER

(71) Applicant: Bosch Corporation, Tokyo (JP)

(72) Inventor: Yuji Hirata, Saitama (JP)

(73) Assignee: Bosch Corporation, Tokyo (JP)

( * ) Notice: Subject to any disclaimer, the term of this patent is extended or adjusted under 35 U.S.C. 154(b) by 185 days.

(21) Appl. No.: 14/912,703

(22) PCT Filed: Aug. 7, 2014

(86) PCT No.: PCT/JP2014/070827
§ 371 (c)(1),
(2) Date: Feb. 18, 2016

(87) PCT Pub. No.: WO2015/025720
PCT Pub. Date: Feb. 26, 2015

(65) Prior Publication Data
US 2016/0200303 A1    Jul. 14, 2016

(30) Foreign Application Priority Data
Aug. 22, 2013  (JP) .................. 2013-172001

(51) Int. Cl.
*B60T 11/232*    (2006.01)
*B60T 11/22*    (2006.01)
(Continued)

(52) U.S. Cl.
CPC .............. *B60T 11/22* (2013.01); *B60T 11/16* (2013.01); *F15B 7/08* (2013.01); *B60T 11/232* (2013.01)

(58) Field of Classification Search
CPC ...... B60T 11/236; B60T 11/232; B60T 11/22; B60T 11/16; B60T 11/26; F15B 7/08
See application file for complete search history.

(56) References Cited

FOREIGN PATENT DOCUMENTS

| JP | 9136639 | 5/1997 |
|---|---|---|
| JP | 2001180471 | 7/2001 |

(Continued)

OTHER PUBLICATIONS

International Search Report for Application No. PCT/JP2014/070827 Sep. 22, 2014 (English Translation, 1 page).

*Primary Examiner* — F. Daniel Lopez
*Assistant Examiner* — Abiy Teka
(74) *Attorney, Agent, or Firm* — Michael Best Friedrich LLP

(57) ABSTRACT

An object is to provide a master cylinder that ensures the responsivity during brake actuation, improves a release delay during brake release, ensures the responsivity during automatic braking, and quickly releases the residual pressure in the hydraulic chamber.

The master cylinder includes a cylinder body having a cylinder hole, a piston slidably inserted into the cylinder hole, the piston partitioning a hydraulic chamber, a communicating passage provided in the cylinder body, the communicating passage communicating with a reserver, a relief port formed in the piston, the relief port performing communication between the communicating passage and the hydraulic chamber, and a seal member housed in a recess portion in an inner peripheral surface of the cylinder hole of the cylinder body, the piston slidably passing through the seal member, the seal member performing sealing between the inner peripheral surface of the cylinder hole and an outer peripheral surface of the piston, the communicating passage communicating with the relief port during non-actuation, the piston moving to block the communicating passage from the relief port using the seal member during actuation, in which a flow passage control member for opening and closing the relief port is provided in a part of the relief port close to the hydraulic chamber.

10 Claims, 4 Drawing Sheets

(51) Int. Cl.
 *F15B 7/08* (2006.01)
 *B60T 11/16* (2006.01)

(56) References Cited

FOREIGN PATENT DOCUMENTS

JP          2007022363          2/2007
JP          2007022363 A   *   2/2007  ............. B60T 11/16

* cited by examiner

[Fig.1]
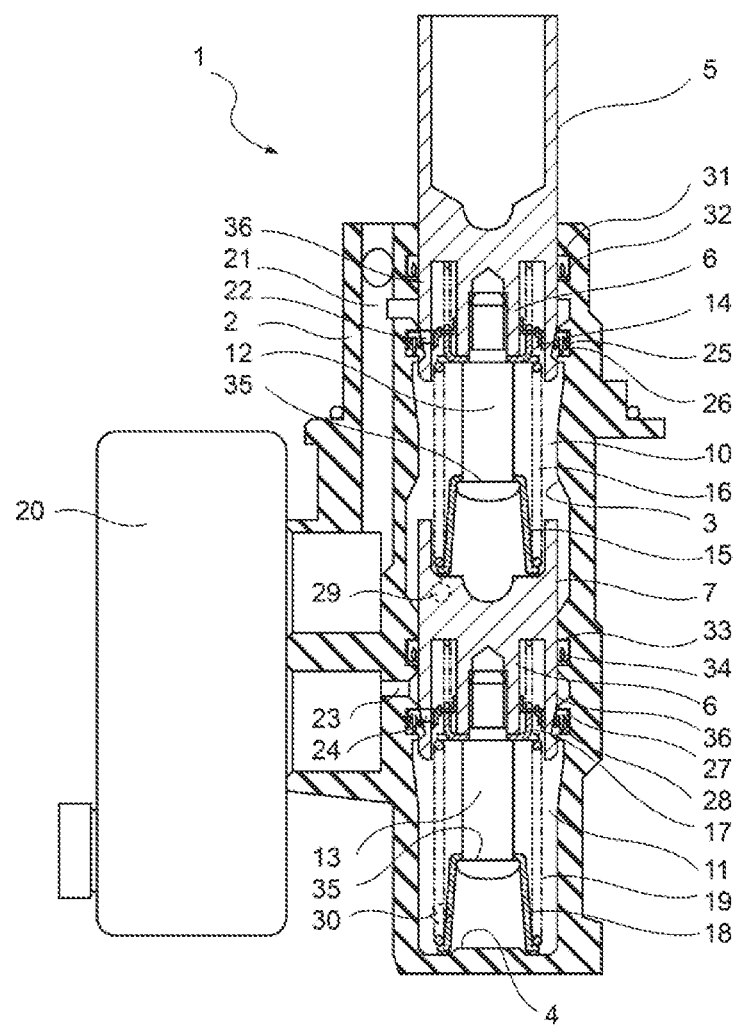

[Fig.2]
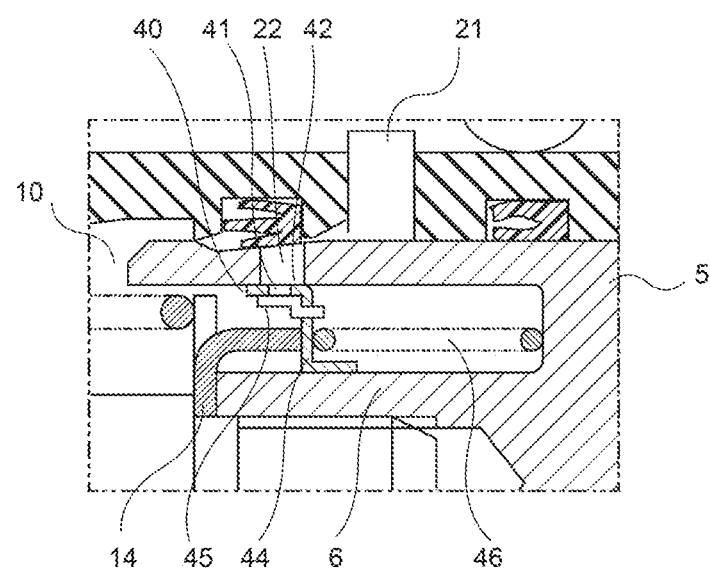

[Fig.3]
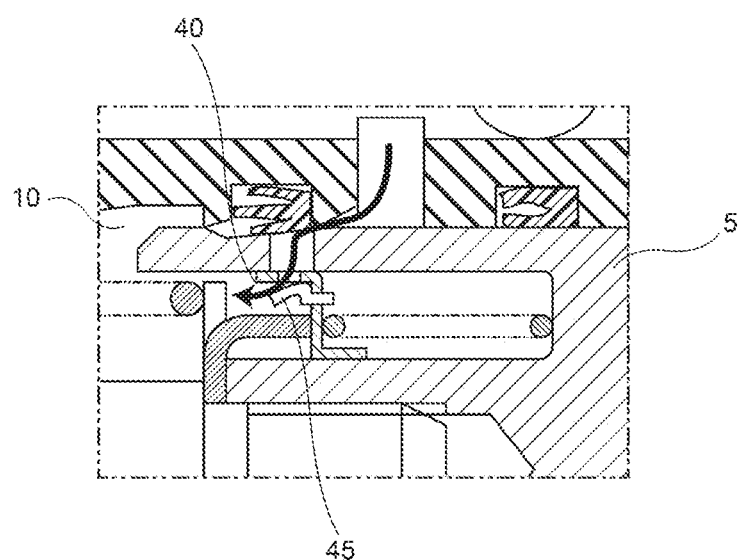

[Fig.4]
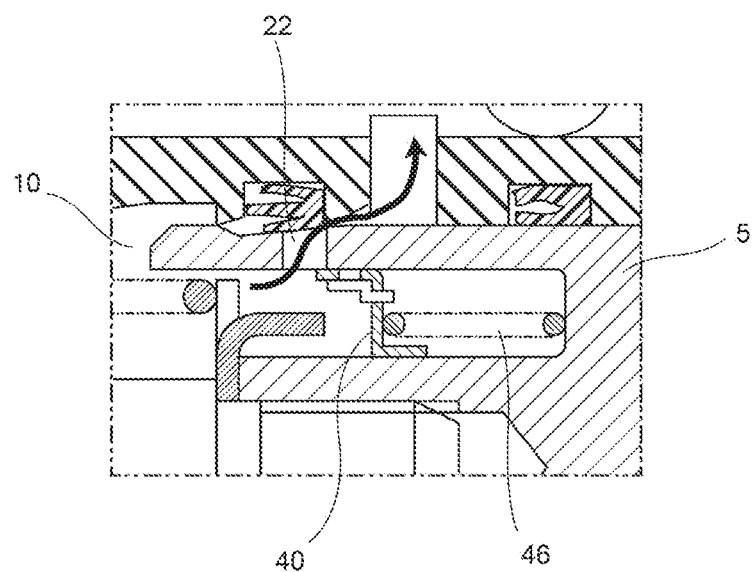

MASTER CYLINDER

BACKGROUND OF THE INVENTION

The present invention relates to a master cylinder used in a hydraulic brake system for vehicles such as automobiles.

Conventionally, such a master cylinder includes a cylinder body having a cylinder hole, a piston slidably inserted into the cylinder hole, the piston partitioning a hydraulic chamber, a communicating passage provided in the cylinder body, the communicating passage communicating with a reservoir, a relief port formed in the piston, the relief port performing communication between the communicating passage and the hydraulic chamber, and a seal member housed in a recess portion in an inner peripheral surface of the cylinder hole of the cylinder body, the piston slidably passing through the seal member, the seal member performing sealing between the inner peripheral surface of the cylinder hole and an outer peripheral surface of the piston, in which the communicating passage communicates with the relief port during non-actuation and the piston moves to block the communicating passage from the relief port using the seal member during actuation.

The relief port has a function as a throttle that suppresses a flow of a hydraulic fluid from the hydraulic chamber to the reservoir before the seal member passes and the function ensures the brake responsivity at the early state of depression of the brake pedal. However, when a rapid liquid flow of the hydraulic fluid from the reservoir side to the hydraulic chamber side is generated by a pressure reduction trend in the hydraulic chamber caused during the releasing of a sudden brake operation, the above throttle effect of the relief port prevents the fluid from being speedily supplied to the hydraulic chamber, possibly causing a return delay of the piston or a release delay of the brake. In addition, as recent brake control for vehicles, there is an automatic brake system that detects the state of a running vehicle in addition to braking operations by the driver and, based on the detection result, automatically applies a predetermined braking force to the wheels. In this case, the hydraulic pump sucks and pressurizes the hydraulic fluid via the communicating passage and the hydraulic chamber and supplies the hydraulic fluid to the brake device side of the vehicle. However, the above throttle effect of the relief port may make the sucking of the hydraulic fluid insufficient.

To solve this problem, there is a brake system having flow passage control means that has the first state in which a restricted flow passage using a small passage having a relatively smaller flow area than the relief port is formed in a communicating passage and the second state in which a bypass flow passage bypassing the small passage is formed in the communicating passage and performs switching between the first state and the second state by deforming or moving in the communicating passage when receiving a flow of the hydraulic fluid (see JP-A-2001-180471).

SUMMARY OF THE INVENTION

However, the small passage has the effect of suppressing a flow of the hydraulic fluid from the hydraulic chamber to the reservoir before the seal member passes in the relief port during actuation, but strong brake responsivity cannot be obtained at the same time with actuation. In addition, when a residual pressure is generated in the hydraulic chamber due to the heat expansion of the hydraulic fluid and the backflow of the hydraulic fluid to the master cylinder after the actuation of the automatic brake system, it is impossible to release the residual pressure by immediately opening the relief port.

An object of the invention is to provide a master cylinder that further ensures the responsivity during brake actuation, improves a release delay during brake release, ensures responsivity during automatic braking, and quickly releases the residual pressure in the hydraulic chamber.

The invention designated in the appended claims is configured to solve the above problems.

According to a first aspect of the present application, there is provided a master cylinder including a cylinder body having a cylinder hole, a piston slidably inserted into the cylinder hole, the piston partitioning a hydraulic chamber, a communicating passage provided in the cylinder body, the communicating passage communicating with a reservoir, a relief port formed in the piston, the relief port performing communication between the communicating passage and the hydraulic chamber, and a seal member housed in a recess portion in an inner peripheral surface of the cylinder hole of the cylinder body, the piston slidably passing through the seal member, the seal member performing sealing between the inner peripheral surface of the cylinder hole and an outer peripheral surface of the piston, the communicating passage communicating with the relief port during non-actuation, the piston moving to block the communicating passage from the relief port using the seal member during actuation, in which a flow passage control member for opening and closing the relief port is provided in a part of the relief port close to the hydraulic chamber.

In this structure, the responsivity during brake actuation can be further ensured, a release delay during brake release can be improved, the responsivity during automatic braking can be ensured, and the residual pressure in the hydraulic chamber can be released quickly.

According to a second aspect of the application, there is provided the master cylinder according to the first aspect, in which the flow passage control member is provided with a valve mechanism closing the relief port during actuation.

In this structure, the responsivity during brake actuation can be further ensured using a simple structure.

According to a third aspect of the application, there is provided the master cylinder according to the first aspect, in which the flow passage control member is provided with a valve mechanism opening the relief port when a pressure of the communicating passage is higher than a pressure of hydraulic chamber during non-actuation.

In this structure, the responsivity during automatic braking can be ensured using a simple structure.

According to a fourth aspect of the application, there is provided the master cylinder according to any one of the first to third aspects, in which the piston is provided with a spring member movable in an axial direction of the piston so that the flow passage control member opens the relief port when a pressure of hydraulic chamber is higher than a pressure of the communicating passage during non-actuation.

In this structure, a release delay during brake release can be improved and the residual pressure in the hydraulic chamber can be released quickly using a simple structure.

According to a fifth aspect of the application, there is provided the master cylinder according to any one of the first to fourth aspects, in which the flow passage control member includes a valve seat having an opening portion corresponding to the relief port and an elastically deformable flap section opening and closing the opening portion.

In this structure, the responsivity during brake actuation can be further ensured, a release delay during brake release can be improved, the responsivity during automatic braking can be ensured, and the residual pressure in the hydraulic chamber can be released quickly using a simple structure.

BRIEF DESCRIPTION OF THE DRAWINGS

FIG. 1 is a cross sectional view illustrating an entire master cylinder according to an embodiment of the present invention.

FIG. 2 is an enlarged cross sectional view illustrating a key part close to a primary piston in FIG. 1 in a state in which the pressure in a first hydraulic chamber is balanced with the pressure in a first communicating passage when the master cylinder is not actuated.

FIG. 3 is an enlarged cross sectional view illustrating the key part close to the primary piston in FIG. 1 in a state in which an automatic brake is actuated and the pressure of brake fluid in the first hydraulic chamber starts reducing when the master cylinder is not actuated.

FIG. 4 is an enlarged cross sectional view illustrating the key part close to the primary piston in FIG. 1 in a state in which the primary piston returns to the inoperative position after a brake operation is released and the residual pressure still remains in the first hydraulic chamber.

DETAILED DESCRIPTION

An embodiment of the application of the present invention will be described below with reference to the drawings.

FIG. 1 illustrates an entire master cylinder according to an embodiment of the present invention. As illustrated in FIG. 1, a plunger type master cylinder 1 has a cylinder body 2 and a cylinder hole 3 is formed in the cylinder body 2.

A primary piston 5, which is an example of pistons according to the invention, and a secondary piston 7, which is also an example of pistons according to the invention, are slidably inserted into the cylinder hole 3. The primary piston 5 is moved to the left by a brake pedal (not illustrated) or a brake booster boosting and outputting the depressing force of the brake pedal. The primary piston 5 and the secondary piston 7 partition and form a first hydraulic chamber 10 between the primary piston 5 and the secondary piston 7 and partition and form a second hydraulic chamber 11 between the secondary piston 7 and a bottom 4 of the cylinder hole 3 in the cylinder hole 3.

In the first hydraulic chamber 10, the first shaft member 12 is fixed by a screw to a pole 6 disposed at the axial center of the primary piston 5 and the first shaft member 12 is provided with a pair of left and right (first and second) retainers 14 and 15. The first retainer 14 is fixed to the first shaft member 12 while the second retainer 15 is provided slidably with respect to the first shaft member 12. Since the second retainer 15 makes contact with a locking portion 35 formed at the left end of the first shaft member 12, the first retainer 14 and the second retainer 15 are away from each other at the maximum as illustrated in FIG. 1. A first return spring 16 is provided between the first and second retainers 14 and 15 in a contracted manner. The first retainer 14 constantly makes contact with the primary piston 5 and the second retainer 15 constantly makes contact with the secondary piston 7 and, when the plunger type master cylinder 1 illustrated in FIG. 1 is not actuated, the primary piston 5 is away from the secondary piston 7 at the maximum.

In addition, in the second hydraulic chamber 11, the second shaft member 13 is fixed by a screw to the pole 6 disposed at the axial center of the secondary piston 7 and the second shaft member 13 is provided with a pair of left and right (third and fourth) retainers 17 and 18. The third retainer 17 is fixed to the second shaft member 13 while the fourth retainer 18 is provided slidably with respect to the second shaft member 13. Since the fourth retainer 18 makes contact with the locking portion 35 formed at the left end of the second shaft member 13, the third retainer 17 and the fourth retainer 18 are away from each other at the maximum as illustrated in FIG. 1. A second return spring 19 is provided between the third and fourth retainers 17 and 18 in a contracted manner. The third retainer 17 constantly makes contact with the secondary piston 7 and the fourth retainer 18 constantly makes contact and, when the plunger type master cylinder 1 illustrated in FIG. 1 is not actuated, the bottom 4 is away from the secondary piston 7 at the maximum.

The cylinder body 2 is provided with a reserver 20. The reserver 20 can communicate with the first hydraulic chamber 10 via a first communicating passage 21 and a first relief port 22, formed in the primary piston 5, that constantly communicates with the first hydraulic chamber 10. The first relief port 22 includes a radial direction communicating hole, bored in a cylindrical part 36 of the primary piston 5, that performs communication between the first hydraulic chamber 10 provided on the inner periphery side of the primary piston 5 and the first communicating passage 21 provided on the outer periphery side. In addition, the reserver 20 can communicate with the second hydraulic chamber 11 via a second communicating passage 23 and a second relief port 24 formed in the secondary piston 7. As in the first relief port 22, the second relief port 24 also includes a radial direction communicating hole, bored in the cylindrical part 36 of the secondary piston 7, that performs communication between the second hydraulic chamber 11 provided on the inner periphery side of the secondary piston 7 and the second communicating passage 23 provided on the outer periphery side.

In a first recess portion 25 of the cylinder hole 3 in which the primary piston 5 is disposed, a first seal member 26, which is, for example, an annular cup seal with a substantially E-shaped cross section, is housed and the primary piston 5 passes through the first seal member 26 liquid-tightly and slidably.

The first hydraulic chamber 10 communicates with a first output port 29 and is connected to the wheel cylinder of the wheel of one brake system of two brake systems (not illustrated) via the first output port 29. In addition, the second hydraulic chamber 11 communicates with a second output port 30 and is connected to the wheel cylinder of the wheel of the other brake system of the two brake systems (not illustrated) via the second output port 30.

A first hermetically sealed recess 31 is provided in the inner periphery of the cylinder hole 3 of the cylinder body 2 in which the primary piston 5 is disposed and the first hermetically sealed recess 31 is provided with a first hermetical seal 32. The primary piston 5 slidably passes through the first hermetical seal 32. The cup seal of the first hermetical seal 32 is formed by a conventionally known cup seal unlike the above cup seal of the first seal member 26 and ensures the liquid-tightness between the inner peripheral surface of the cylinder hole 3 of the cylinder body 2 and the outer peripheral surface of the primary piston 5.

A second recess portion 27 of the cylinder hole 3 in which the secondary piston 7 is disposed houses, for example, an annular second seal member 28, a second hermetically sealed recess 33 is provided with a second hermetical seal 34, and the secondary piston 7 passes through the second seal member 28 and the second hermetical seal 34 liquid-tightly and slidably. The second recess portion 27, the second seal member 28, the second hermetically sealed recess 33, and the second hermetical seal 34 are configured exactly the same as the first recess portion 25, the first seal member 26, the first hermetically sealed recess 31, and the first hermetical seal 32 illustrated in FIG. 2. Accordingly, the detailed description of the second recess portion 27, the second seal member 28, the second hermetically sealed recess 33, and the second hermetical seal 34 is omitted.

FIG. 2 is an enlarged cross sectional view illustrating a key part close to the primary piston 5 in FIG. 1 in a state in which the pressure in the first hydraulic chamber 10 is balanced with the pressure in the first communicating passage 21 when the plunger type master cylinder 1 is not actuated.

A flow passage control member 40 is disposed on the inner periphery of the first relief port 22. The flow passage control member 40 includes a first annular section 42 having an opening portion 41 in a position that is slidable on the inner peripheral surface of the first relief port 22 and faces the first relief port 22, a second annular section 43 disposed slidably on the pole 6 positioned in the axial center of the primary piston 5, a disc section 44 coupling both annular sections to each other, a flap valve 45 that can open and close the opening portion 41 of the first annular section 42. This flow passage control member 40 makes contact with the first retainer 14 by causing a spring 46 mounted on the outer periphery of the pole 6 of the primary piston 5 to press the disc section 44. In addition, the flap valve 45 is attached to the first annular section 42. In a state in which the pressure of the first hydraulic chamber 10 is balanced with the pressure of the first communicating passage 21 when the plunger type master cylinder 1 is not actuated, the flow passage control member 40 makes contact with the first retainer 14 in this way, the flap valve 45 closes the first relief port 22, and the brake fluid in the first hydraulic chamber 10 is sealed.

When the brake pedal is depressed, the primary piston 5 moves to the left. Since the first relief port 22 is closed by the flap valve 45 of the flow passage control member 40, the brake fluid in the first hydraulic chamber 10 is pressurized and the brake immediately begins to take hold at the same time with movement of the primary piston 5.

FIG. 3 is an enlarged cross sectional view illustrating the key part close to the primary piston 5 in FIG. 1 in a state in which, for example, a side slip prevention apparatus (Electronic Stability Control), which is a type of automatic brake, is actuated and the pressure of the brake fluid in the first hydraulic chamber 10 starts reducing when the plunger type master cylinder 1 is not actuated.

When the control of automatic brake actuation begins, the hydraulic pump of a hydraulic unit (not illustrated) starts operating. Since the hydraulic pump sucks the hydraulic fluid from the reserver 20 to the first hydraulic chamber 10 and supplies the sucked hydraulic fluid to the brake devices of the wheels via the hydraulic pressure pipe. At this time, the first hydraulic chamber 10 has a negative pressure, the flap valve 45 of the flow passage control member 40 is elastically deformed radially inward as illustrated in the drawing, and the hydraulic fluid in the reserver 20 is supplied to the first hydraulic chamber 10.

FIG. 4 is an enlarged cross sectional view illustrating the key part close to the primary piston 5 in FIG. 1 in a state in which the primary piston 5 returns to the inoperative position after brake operation is released and the residual pressure still remains in the first hydraulic chamber 10.

The residual pressure in the first hydraulic chamber 10 is applied in a direction in which the spring 46 is contracted from the right of the flow passage control member 40, the flow passage control member 40 is moved to the right, and the first relief port 22 is opened so that the first relief port 22 communicates with the first hydraulic chamber 10. This reduces the residual pressure and returns the flow passage control member 40 to a predetermined inoperative position (FIG. 2).

Although FIGS. 2, 3, and 4 illustrate the operation of the part close to the primary piston 5, the part close to the secondary piston 7 operates similarly in conjunction with the part close to the primary piston 5.

The invention claimed is:

1. A master cylinder comprising:
a cylinder body having a cylinder hole;
a piston slidably inserted into the cylinder hole, the piston partitioning a hydraulic chamber;
a communicating passage provided in the cylinder body, the communicating passage communicating with a fluid reserve;
a relief port formed in the piston, the relief port providing communication between the communicating passage and the hydraulic chamber; and
a seal member housed in a recess portion in an inner peripheral surface of the cylinder hole of the cylinder body, the piston slidably passing through the seal member, the seal member providing sealing between the inner peripheral surface of the cylinder hole and an outer peripheral surface of the piston, the communicating passage communicating with the relief port during non-actuation, the piston moving to block the communicating passage from the relief port using the seal member during actuation,
wherein a flow passage control member for opening and closing the relief port is provided in a part of the relief port close to the hydraulic chamber, the flow passage control member being adapted to open and close the relief port, wherein in the closed state of the relief port, brake fluid in the hydraulic chamber is sealed.

2. The master cylinder according to claim 1,
wherein the flow passage control member is provided with a valve mechanism closing the relief port during actuation.

3. The master cylinder according to claim 1,
wherein the flow passage control member is provided with a valve mechanism opening the relief port when a pressure of the communicating passage is higher than a pressure of hydraulic chamber during non-actuation.

4. The master cylinder according to claim 1,
wherein the piston is provided with a spring member movable in an axial direction of the piston so that the flow passage control member opens the relief port when a pressure of hydraulic chamber is higher than a pressure of the communicating passage during non-actuation.

5. The master cylinder according to claim 1,
wherein the flow passage control member includes a valve seat having an opening portion corresponding to the relief port and an elastically deformable flap section opening and closing the opening portion.

6. The master cylinder according to claim 2,
wherein the piston is provided with a spring member movable in an axial direction of the piston so that the flow passage control member opens the relief port when a pressure of hydraulic chamber is higher than a pressure of the communicating passage during non-actuation.

7. The master cylinder according to claim 2,
wherein the flow passage control member includes a valve seat having an opening portion corresponding to the relief port and an elastically deformable flap section opening and closing the opening portion.

8. The master cylinder according to claim 3,
wherein the piston is provided with a spring member movable in an axial direction of the piston so that the flow passage control member opens the relief port when a pressure of hydraulic chamber is higher than a pressure of the communicating passage during non-actuation.

9. The master cylinder according to claim 3,
wherein the flow passage control member includes a valve seat having an opening portion corresponding to the relief port and an elastically deformable flap section opening and closing the opening portion.

10. The master cylinder according to claim 4,
wherein the flow passage control member includes a valve seat having an opening portion corresponding to the relief port and an elastically deformable flap section opening and closing the opening portion.

* * * * *